T. H. DODGE.

Mowing Machine

No. 31,520.

2 Sheets—Sheet 1.

Patented Feb. 19, 1861.

Witnesses:
John Dunney Adams
A.C.W. Friends

Inventor:
Thomas H. Dodge

T. H. DODGE.
Mowing Machine

No. 31,520.

2 Sheets—Sheet 2.

Patented Feb. 19, 1861.

Witnesses:

Inventor:
Thomas H. Dodge

UNITED STATES PATENT OFFICE.

THOMAS H. DODGE, OF WASHINGTON, DISTRICT OF COLUMBIA.

IMPROVEMENT IN MOWING-MACHINES.

Specification forming part of Letters Patent No. 31,520, dated February 19, 1861.

*To all whom it may concern:*

Be it known that I, THOMAS H. DODGE, of the city and county of Washington, in the District of Columbia, have invented certain new and useful Improvements in Mowing-Machines; and I do hereby declare that the following is a sufficiently full and exact description thereof to enable those skilled in the art to which my invention belongs to make and use the same, reference being had to the accompanying drawings, and to the letters of reference marked thereon, forming a part of this specification.

Figure 1:
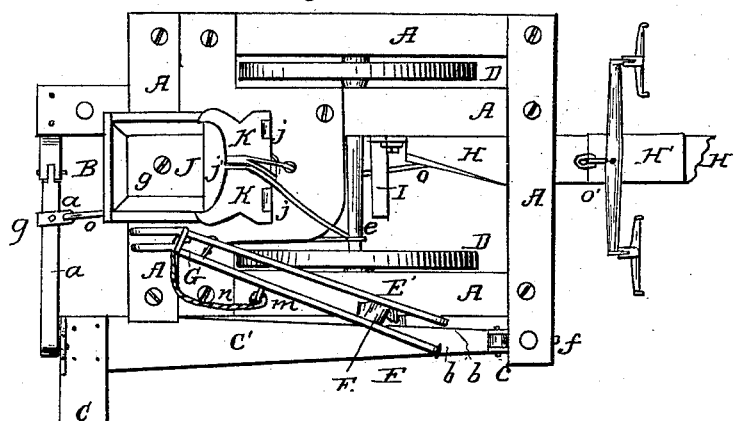
Figure 2:
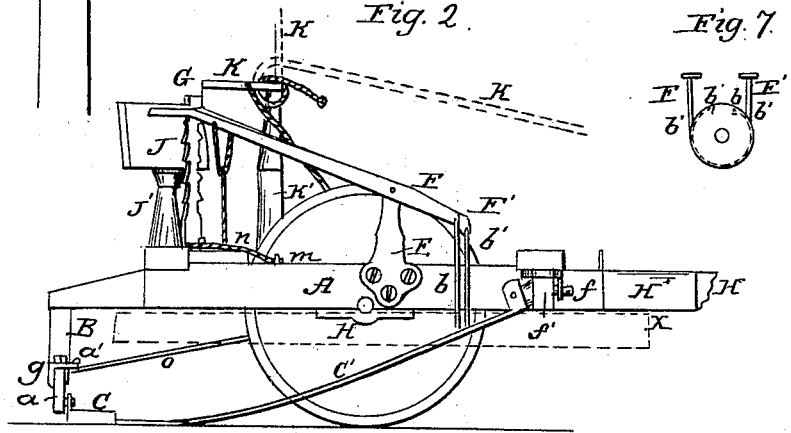
Figure 7:
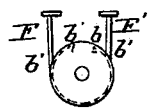
Figure 3:
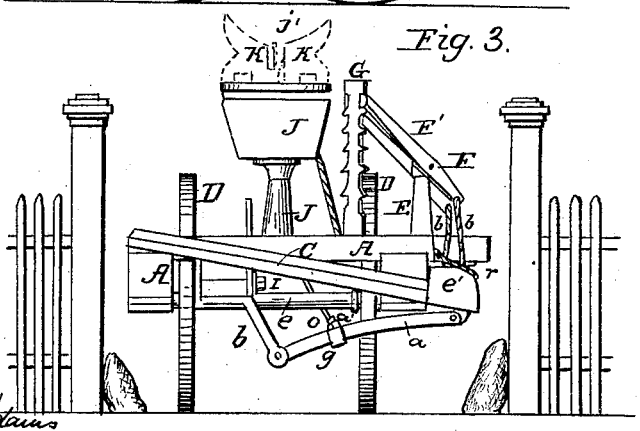
Figure 6:
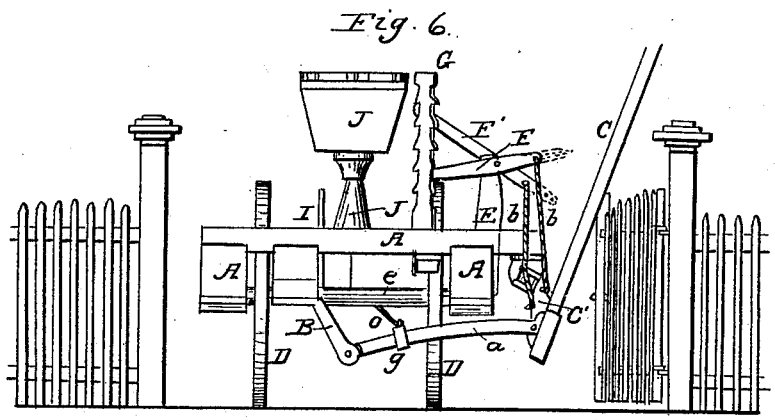
Figure 5:
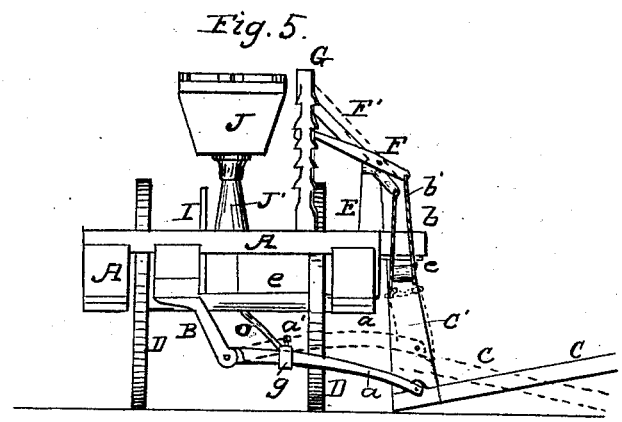
Figure 4:
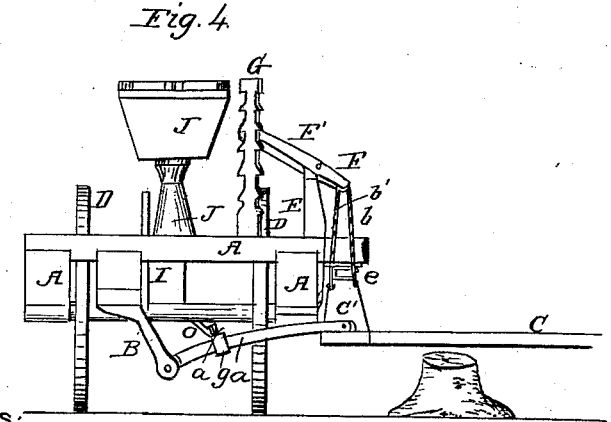

Figure 1 represents a plan view of the machine. Fig. 2 represents a side view of the machine. Fig. 3 represents a rear view showing the finger-bar which supports the cutting apparatus turned over in rear of the driver's seat and resting on an extension of a part of the main frame. Fig. 4 represents a rear view showing the finger-bar raised to pass over obstructions; Fig. 5, a rear view showing the finger-bar in two different positions, one represented in red lines and the other in black lines; Fig. 6, a rear view showing the finger-bar folded up toward the main frame, for the purpose of passing through gates or from field to field; and Fig. 7 is a modification of the apparatus, by which either end of the finger-bar can be raised.

A represents a rectangular frame supported on two wheels, D D. These wheels are shown attached to one common axle or shaft, e; but they may have independent shafts, together with any of the well-known forms and arrangements of gearing and cutters combined therewith—one good form and arrangement being found in the mowing-machine patented to E. Ball and John Butler, assignees of E. Ball, on the 1st day of December, 1857, and of which machine my present invention is an improvement.

The nature of my invention consists in combining with the main frame and drag-bar or shoe in said Ball's machine a lifting-lever and cord or chain.

It also consists in extending the drag-bar or shoe back far enough to permit the finger-beam to be folded over in rear of the main frame, in combination with a rear projection from said frame, for supporting the beam after it is folded over, substantially as shown in the drawings.

As the various parts of my machine represented in the drawings are fully set forth in Letters Patent granted to me on the 15th day of November, 1859, I shall confine my description to features of invention which form the subject of this patent.

In the practical use of the machine known as "Ball's Ohio Mower," patented on the 1st day of December, 1857, it was found that serious objections existed to its general use, since there was no means provided whereby the driver could raise or elevate the heel of the finger-beam and lower end of the shoe or drag-bar in passing over rough or uneven ground, or whereby the heel of the finger-beam and lower end of the drag-bar could be suspended so as to bear with a very light pressure on the ground or stubble, to avoid friction and side draft. One way in which I have obviated the above objections is shown in this machine, and consists in attaching one end of a cord or chain, $b'$, to the drag-bar or shoe $C'$, and the other end to one end of a lever, $F'$, fulcrumed to a post or standard, E, attached to the inner side of the machine, the opposite end of lever $F'$ being extended back so as to be under the control of the driver at his seat J. Now as the driver depresses the rear end of lever $F'$ the rear end of the drag-bar, together with the heel of the finger-beam, is elevated, and when necessary the parts can be raised up, as shown in red lines, Fig. 5, and there held by allowing the lever to catch in one of the notches in standard G. By this arrangement the driver has full control over the heel of the finger-beam and lower end of the drag-bar, and consequently can cause the parts to be elevated at any required height from the ground to pass over cut grass, stones, and other obstructions, or to run just clear of the ground on level fields, to avoid too much friction and side draft. Lever F and cord or chain $b$ are added for the purpose of giving the driver control of the outer end of the finger-beam, as shown in black lines, Fig. 5.

When the machine is to be moved some distance from field to field or packed for storage, it is convenient to have the finger-beam folded over in rear of the driver's seat, as shown in Fig. 3, where it is supported by a piece extending back from the main frame, and to which the hanger B is attached.

It will be seen that the drag-bar is made to extend back in rear of the main frame so as to permit of the finger-beam and cutting apparatus to fold clear of the seat J.

A cord or chain, n, fastened to the frame at m, can be employed to fasten the drag-bar C' up firmly to the frame, if desired.

H is the tongue, hinged at x for the purpose of being folded under the frame, as seen in red lines, Fig. 2, when the machine is not in use. The tongue is made rigid by means of a metallic slide-piece, H', which is to be slipped over the joint, as shown in black lines, Figs. 1 and 2.

The finger-beam C is attached to the lower end of the drag-bar C', which in turn is hinged at c to a wrist, f, which turns in piece f'', attached to the under front inner cornner of the main frame A. The coupling-piece a is hinged at both ends.

The team is attached to the machine as indicated it Fig. 1, so that the machine is drawn by a flexible connection, o, which passes through a hole in the tongue, thence back under the frame, and is fastened to an adjusting-piece, g, on the piece a.

K is a folding guard to prevent the driver from being thrown from his seat, and which is also used as a hitch for the reins k, as seen in red lines, Fig. 2.

Having described one practical way in which my invention may be applied to use, what I claim under this patent is—

1. The combination, with the drag-bar or shoe and heel of the finger-beam of "E. Ball's Ohio Mower," patented December 1, 1857, of a lifting-lever and cord or chain, whereby the driver can cause the heel of the finger-beam to rest very lightly on the stubble or ground, or be raised entirely above both.

2. Extending the drag-bar back so as to permit the finger-beam to fold over in rear of the driver's seat, in combination with a rear extension-piece for its support, substantially as described.

THOMAS H. DODGE.

Witnesses:
JOHN QUINCY ADAMS,
A. C. WIDDICOMB.